No. 641,779. Patented Jan. 23, 1900.
R. R. KINNEY & G. P. BARNARD.
BURIAL APPARATUS.
(Application filed Jan. 9, 1899.)
(No Model.)
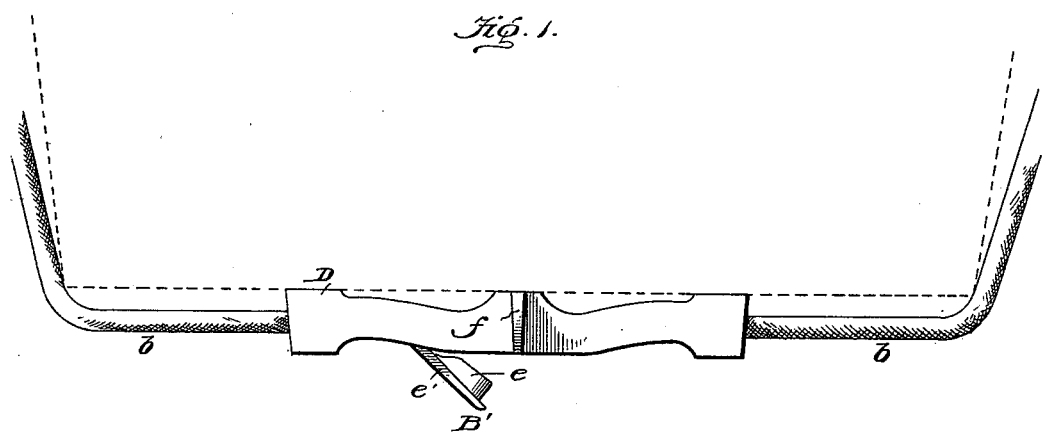
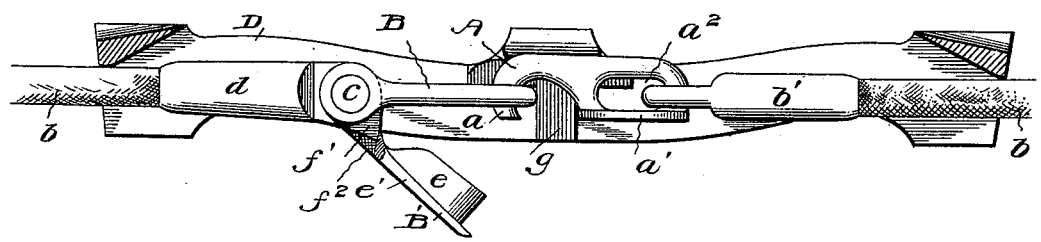
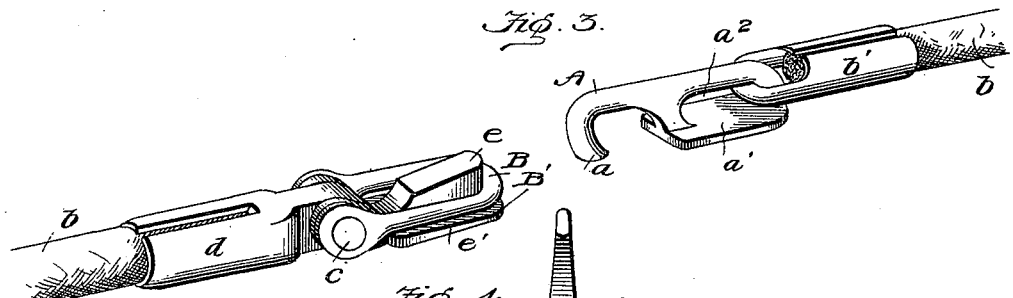
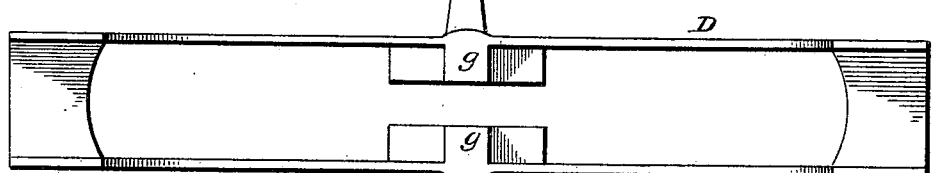
Witnesses
Inventors
Richard R. Kinney
Gardner P. Barnard
BY Edson Bro's
Attorneys

UNITED STATES PATENT OFFICE.

RICHARD R. KINNEY AND GARDNER P. BARNARD, OF COLDWATER, MICHIGAN.

BURIAL APPARATUS.

SPECIFICATION forming part of Letters Patent No. 641,779, dated January 23, 1900.

Application filed January 9, 1899. Serial No. 701,619. (No model.)

*To all whom it may concern:*

Be it known that we, RICHARD R. KINNEY and GARDNER P. BARNARD, citizens of the United States, residing at Coldwater, in the county of Branch and State of Michigan, have invented certain new and useful Improvements in Burial Apparatus; and we do hereby declare the following to be a full, clear, and exact description of the invention, such as will enable others skilled in the art to which it appertains to make and use the same.

Our invention relates to certain improvements in devices or apparatus adapted to provide for the lowering of a weight or body, more especially a burial-casket containing a human body, into the grave or excavation, as usually practiced in interments.

It has for its objects, among other things, to greatly simplify construction, lessen cost of manufacture, promote lightness consistent with strength, and insure security or safety in manipulation and the automatic actuation of the parts in disconnecting or releasing the same; also, the ready withdrawal of the casket-lowering ropes thereafter, and to prevent the liability of the obstructing of the coupling-sections in effecting the withdrawal or removal of the same.

It consists, primarily, of a coupling and detaching device whose parts are automatically released or separable and the combination thereof with a retaining device, all substantially as hereinafter more fully disclosed, and specifically pointed out in the claims.

In the accompanying drawings, illustrating the preferred embodiment of our invention, Figure 1 is a view showing the same as applied for use to a casket, taken in cross-section, with the lowering-ropes broken away. Fig. 2 is a perspective view of the invention with the retaining device taken in section. Fig. 3 is a view showing the coupling-sections of the detaching device or coupling disconnected or uncoupled and the retaining device removed. Fig. 4 is an inverted view of the retaining device.

It will be understood that latitude is allowed herein as to details of the construction and arrangement of the parts, as they may be varied or changed without departing from the spirit of our invention and the same yet remain intact and protected.

This invention is especially designed to be substituted for the form of coupling and detaching device disclosed in our Letters Patent dated July 5, 1898, No. 606,722, dispensing more particularly with the T form of casting and other objectionable features thereof; and to these ends we employ, chiefly, a hook A and a link B, together with a shoe or trip B', pivotally connected with said link. Incidentally we employ in connection therewith a simple retaining device, hereinafter described, which may be used as a rest for holding the casket or weight in place, thus dispensing with the usual strips or cleats used in a casket-receiving box to facilitate the withdrawal of the casket-lowering straps or ropes.

The hook A is preferably of the form shown, having an almost right-angularly disposed short beak or point $a$, being, however, somewhat or slightly inclined inward and having at its opposite end portion, upon its normally lower side, a plate-like or laterally-extended portion $a'$, and above this latter a preferably elongated opening or slot $a^2$, where connection is effected with one of the casket-lowering ropes $b$ or like means for that purpose. The rope has, preferably, clamped upon its end an eye-ended split sleeve or socket $b'$, stamped or swaged up in any suitable manner to make a freely-playing or loose joint connection with the hook A, through the slot or opening $a^2$, as will be readily understood, to permit the unrestricted movement of said rope without affecting the hook when in coupled position and to facilitate the withdrawal of the ropes or straps.

The link or keeper B is pivoted or hinged by a pivot or pintle $c$ preferably to an edgewise-disposed flat-sided extension or projection of a split sleeve or socket $d$, clamped upon the opposite casket-lowering rope $b$, similarly as the split sleeve or socket $b'$ is secured upon the other casket-lowering rope. The trip or shoe B' is pivotally connected with said link or keeper and adapted to normally depend or deflect downward therefrom, the pivotal connection of said trip with said keeper or link being effected by the same pivot or pintle c as effects connection between said keeper or link and the casket-lowering rope-socket.

The pintle or pivot c is headed down flush with the lateral edges of the link B, and the latter is adapted to compass the salient portion or projection e of the trip B' and rest upon the laterally extended or flanged portion e' of said trip below the end of edge of said projection e of the trip to fully remove said link after the uncoupling operation entirely out of the way to prevent the possibility of its accidental or involuntary catching upon any otherwise obstructing part in withdrawing the casket-lowering ropes. The face or edge of the projection or salient portion e of the trip B' is preferably slightly inclined downward and away from its point of contact or engagement with the beak of the hook a to reduce said point of contact or engagement to the minimum, obviously to more certainly or effectively insure disengagement thereof in uncoupling or releasing the parts. It is also observed that the plate-like or flanged portion of the trip will give it a broad or enlarged contacting surface with the bottom of the casket-receiving box or other contacting surface, rendering more certain the tripping action, while said plate-like or flanged portion is adapted to be deflected downward at an angle from the link, and thus held by a rear end stop or extension $f'$ of the rope-socket engaging the opposite wall of a slot $f^2$ of the trip to permit initial engagement with the casket-receiving box-bottom or other contacting surface to effect the tripping operation, as presently seen.

D is the retaining device, in its general characteristics analogous to the form of retaining device disclosed in Figs. 11 and 12 of the drawings in the Letters Patent above noted. In addition, however, to the curved-down arms or "wings" f, centrally projecting from said retaining device, it is provided at its center upon the inside with opposite substantially T-shaped shoulders or lugs g, the horizontal portions or tops thereof affording bearings for the link as against its upward displacement, while the hook is permitted to readily ride upward between the horizontal portions of said shoulders as it is engaged by the trip. The vertical portions of the shoulders or lugs g serve as stops or abutments for the opposite edges of the plate or flat portions of said hook and the link, thus insuring their proper retention in place as against possible accidental displacement or slipping and prevent the accidental endwise movement of the retaining device or rest on the ropes, and consequently the lateral movement of the weight or casket, thus insuring deposit of the same at the intended spot or place. Also it will be seen that with the casket-lowering ropes under strain or stress, as in lowering the casket, adapted to have contact or engagement with the ends of the retaining device D, as herein, the greater the strain or stress to which the ropes are subjected the more effectively will the hook grip the link aforesaid, and thus insure safety or security in manipulation.

In operation it is apparent that as the casket, with the coupling and detaching device, is nearing the bottom of the casket-receiving box or other contacting surface and as the trip depending at an angle therefrom strikes said bottom of the box the projection e thereof will pass into the link and engage the hook A, tripping the latter and automatically effecting the uncoupling of the ropes, allowing the ready withdrawal thereof upward through and under the retaining device or rest D, which of course remains under the weight, unless independently or otherwise removed.

From the foregoing it is seen that our invention is possessed of the greatest possible utility and facility for its intended purpose, as aforesaid, as well as many other uses for which it is obviously capable, and which it is not necessary herein to recite.

Having thus described our invention, what we therefore claim as new, and desire to secure by Letters Patent thereon, is—

1. An automatically-separable coupling or detaching device, comprising a hook, a link and a trip, said link and trip arranged on a common pivot or pintle and said trip adapted to engage said hook, substantially as set forth.

2. The combination of a hook having a freely playing or turning connection with the part to which it is attached, a link having a pivotal connection with the part to which it is attached, and a trip or shoe having a salient portion pivotally connected with, and depending from, the keeper, said salient portion of the trip adapted to pass into said link and engage said hook, substantially as set forth.

3. The combination of a hook, a link, and a trip, having a salient portion, said trip and the link having a common pivot or pintle and the link adapted to receive the salient portion or projection of the trip, and the trip having a lateral flange or extension at its normally bottom edge adapted to form a rest for said link and prevent its displacement after the tripping operation, substantially as set forth.

4. The combination of a hook, a link, and a trip, having a salient portion, said trip and the link having a common pivot or pintle and the link adapted to receive the salient portion of said trip, said salient portion having an inclined engaging edge, and adapted to engage said hook, substantially as set forth.

5. The combination of a hook, a link, and a trip, having a salient portion, said trip and the link having a common pivot or pintle and the trip having its salient portion compassed by said link and adapted to normally stand or be deflected downward at an angle to said link, substantially as set forth.

6. The combination of a hook having a laterally-flanged or plate-like portion, and a link, and a trip, having a salient portion, said trip having a laterally-flanged or plate-like portion, the salient portion of said trip adapted to pass into said link and engage said hook, and a retaining device having horizontal and vertical shoulders or stops adapted to engage the lateral and forward edges of said hook and link, substantially as set forth.

7. The combination of a hook having a laterally-flanged or plate-like portion, and a link, and a trip, having a salient portion, said trip having a laterally-flanged or plate-like portion, the salient portion of said trip adapted to pass into said link and engage said hook, and a retaining device having horizontal and vertical shoulders or stops adapted to engage the lateral and forward edges of said hook and link, said retaining device adapted to engage at its ends the ropes or parts to which said hook and link and trip are attached, substantially as set forth.

8. In a burial apparatus, a coupling for lowering-straps consisting of a hook member adapted to be carried by one strap, a keeper member adapted to be carried by the other strap, and a tripping-arm pivotally connecting with, and depending from, the keeper member, the depending portion of said arm being movable to engage and release the hook member from the keeper member.

In testimony whereof we affix our signatures in presence of two witnesses.

RICHARD R. KINNEY.
GARDNER P. BARNARD.

Witnesses:
F. B. REYNOLDS,
F. W. STEWART.